United States Patent [19]
Lindeboom

[11] 3,743,304
[45] July 3, 1973

[54] HYDROSTATIC COMPLIANT SLEEVE SEAL

[75] Inventor: Herman Lindeboom, Pennington, N.J.

[73] Assignee: Ingersoll-Rand Company, New York, N.Y.

[22] Filed: Apr. 26, 1971

[21] Appl. No.: 137,281

[52] U.S. Cl. .............................................. 277/27
[51] Int. Cl. .................... F16j 15/24, F16j 15/40
[58] Field of Search ...................... 277/27; 285/110

[56] References Cited
UNITED STATES PATENTS
2,007,501  7/1935  Millmine ............................. 277/27

FOREIGN PATENTS OR APPLICATIONS
446,821  11/1912  France ................................ 277/27

Primary Examiner—Herbert F. Ross
Assistant Examiner—Robert I. Smith
Attorney—Frank S. Troidl and David W. Tibbott

[57] ABSTRACT

This is an improved straight leak-off seal for use in pressurized equipment with shafts. A sleeve is compliant to pressure differentials and conforms to the shaft while it is rotating, reciprocating, or at rest. Within the stress limits of the sleeve the seal has a centralizing effect on the shaft and acts as a constant flow self-regulating valve.

9 Claims, 8 Drawing Figures

INVENTOR
HERMAN LINDEBOOM
BY
Frank S. Troidl
ATTORNEY

INVENTOR
HERMAN LINDEBOOM
BY
Frank S. Troidl
ATTORNEY

PATENTED JUL 3 1973 3,743,304

INVENTOR
HERMAN LINDEBOOM

BY
Frank S. Tridl
ATTORNEY

HYDROSTATIC COMPLIANT SLEEVE SEAL

This invention relates to fluid seals. More particularly, this invention is a new and improved fluid seal for use with either a gas or liquid system wherein the seal members are kept slightly separated.

In currently used leak-off seals, the medium to be sealed flows through the clearance formed by the separation of the seal members. The mating face of one of the seals includes a recessed portion. The shape of the mating face is such that the space berween the two seals adjacent such recessed portion is "restricted", that is, a differential pressure is created. The mating face may also include sealing dams. In such a case the spaces between the two seals adjacent the sealing dams are more restrictive than the space adjacent the recessed portion. The total differential pressure across the space between the two seals controls the pressure profile across the seal face and will determine the operating clearance. My seal may be made with no wearing parts. It can be constructed to operate at pressure ranges of 100 psi to 3,000 psi, 2,000 to 5,000 psi, and 10,000 to 100,000 psi. Further it can be made from materials designed to operate up to 400° F or up to 1,500° F. Besides providing a fluid seal, my invention can also operate as a bearing with a centralizing effect and no metal to metal contact with the shaft whether it is rotating or reciprocating. Finally, at positive system pressures my seal can function as a self-regulating constant flow valve for the fluid under pressure.

BRIEF DESCRIPTION OF THE DRAWINGS

The invention as well as its many advantages may be further understood by reference to the following detailed description and drawing in which.

Like parts throughout the various views are referred to by like numbers.

DESCRIPTION OF THE COMPLIANT SLEEVE SEAL

Figure 1:
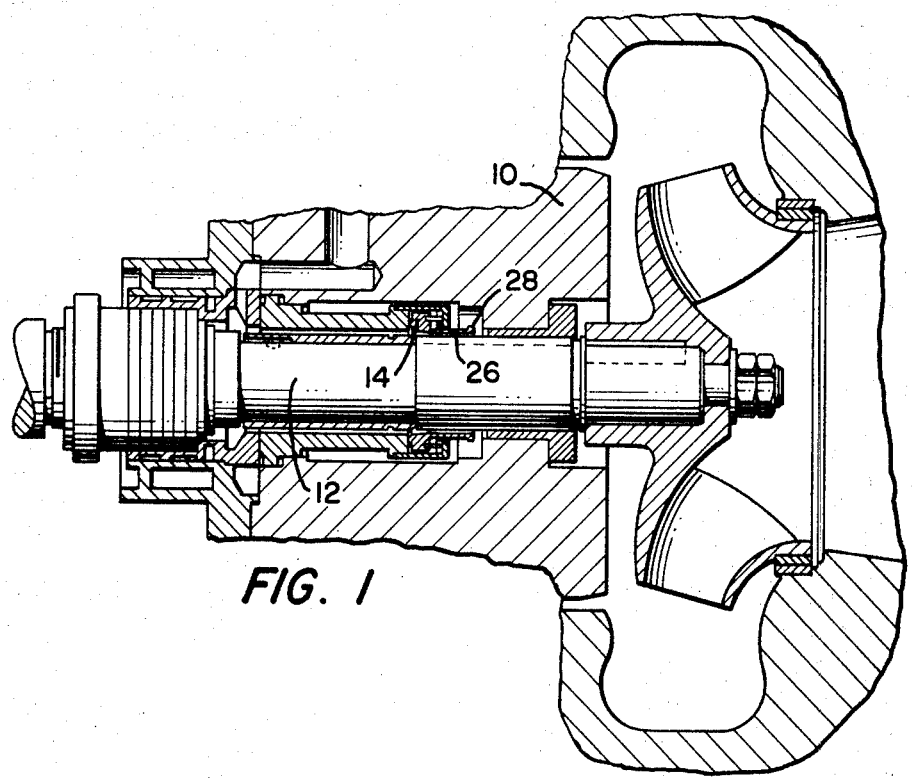
FIG. 1 is a partial section showing the invention mounted with a shaft in a fluid pump.
Figure 8:
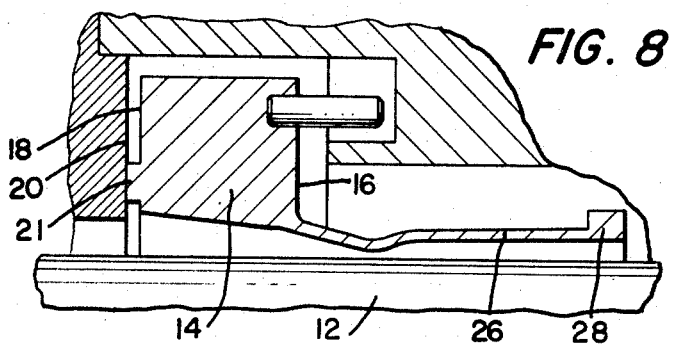
FIG. 8 shows an embodiment in which my invention is a floating seal at low system pressure and a hydrostatic fixed bearing at high system pressure.

Referring to the drawings and particularly to FIGS. 1 and 8, my new seal is illustrated as used as a straight leak-off seal in a fluid pump. A housing 10 is shown in which is installed a shaft 12. When system pressure is low, the flange 14 is able to float and accommodate transverse movements of the shaft. The difference in area of flange faces 16 and 18 creates an axial force which presses the seal flange against the gland face 20. This force is sufficient to prevent leakage past the pressure dam 21, but not so great as to inhibit radial movement of the flange between the housing and gland. When system pressure is high, the axial force on face 20 is sufficient to prevent movement by the flange and my seal becomes a hydrostatic bearing restraining radial movement of the shaft.

Figure 2:
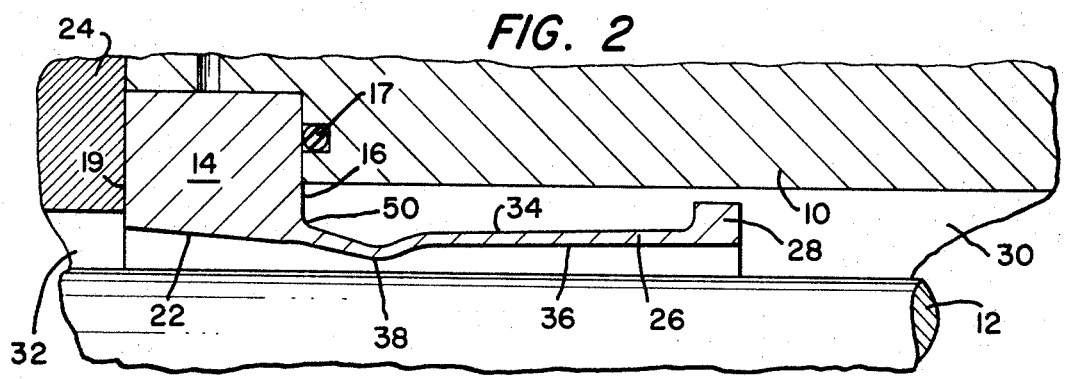
FIG. 2 is an elevational view partly in section showing the use of my new invention as a leak-off compliant sleeve seal and hydrostatic bearing.

The enlarged section of FIG. 2 shows the hydrostatic seal flange 14 is mounted in the housing so that high pressure face 16 of the flange and resilient ring 17 provide a leak-proof seal with the housing. The low pressure face 19 of the seal flange may be open to the atmosphere as is the inner annular surface 22, or it may bear against a gland 24. Projecting from the seal flange 14 is a sleeve 26 compliant to pressure differential which is coaxial with the flange and the shaft 12. At the far end of the sleeve is a collar 28 which primarily provides rigidity during machining of the sleeve. It also contributes stiffness to the sleeve during operation, but is not essential to the proper function of this invention. Similarly, the taper of surface 22 is for convenience in assembly of the shaft, but is not necessary for proper function of the seal.

In operation, the system pressure 30 is greater than the external pressure 32, wich is usually atmospheric pressure. Because the flange maintains a tight seal at surfaces 16, the pressure on the outer surface of the sleeve 34 exceeds the pressure on the inner sleeve surface 36 causing the sleeve to flex and conform to the shaft. As throat 38 is formed, the fluid flow path is constricted, and before actual contact is made with the shaft, the pressure at the point of compliance on the inner sleeve is increased thereby reducing the pressure difference between the inner and outer surface of the sleeve at that point to a value less than the pressure difference at stations of the sleeve proximate to the throat 38. Relaxation at 38 and compliance at the new area of maximum pressure differential in effect circulates the throat and insures a minimum fluid film between shaft and seal.

Figure 3:
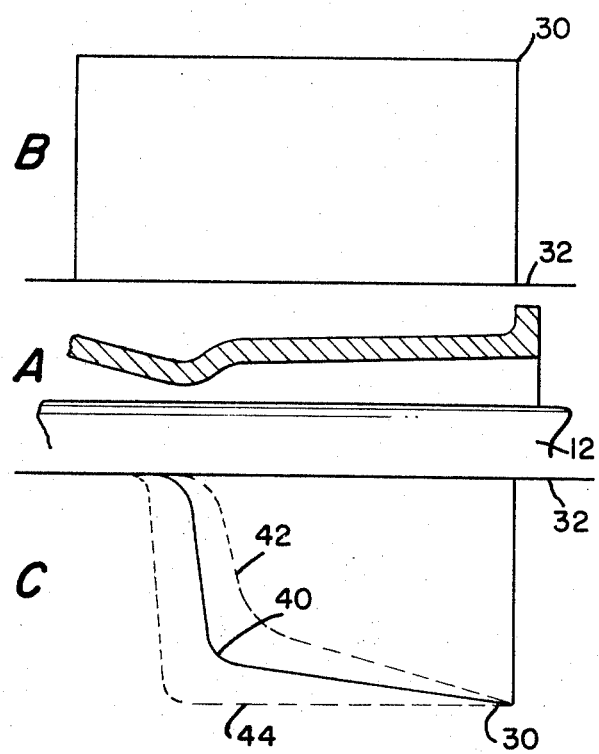
FIG. 3 is a schematic diagram useful in explaining the advantages of my new invention when used as a straight leak-off seal.

FIG. 3 is a schematic diagram showing the pressure profiles for hydrostatic equilibrium of the compliant sleeve seal. "A" illustrates the pressure deflected seal face of the compliant sleeve seal and the shaft seal or a shaft sleeve face. Graph "B" represents the pressure profile acting on the outside diameter of the collar 28 and the sleeve 26, while in graph "C," curve 40 shows the pressure profile acting on the bore or sealing face of the compliant sleeve seal when the seal is centered on the shaft. Curves 42 and 44 represent the pressure profiles for maximum eccentricity between shaft and seal, curve 42 being the profile for the maximum clearance side and 44 the profile for the minimum clearance side. In both diagrams the base line 32 represents atmospheric pressure and 30 the maximum or system pressure. The curves represent points on the sleeve which are 180° apart, and the area enclosed between curves 42 and 44 is equal to the restoring or centering forces of the seal, demonstrating how the seal acts as a bearing.

Referring again to FIG. 2, the point of maximum deflection of the sleeve will move to the station where the pressure difference between the inner and outer surface of the sleeve is greatest. When the sleeve joins the flange, of course, the sleeve is its stiffest and its maximum deflecton is limited. To maximize fatigue life the radius 50 at the juncture of the flange and the sleeve is formed to minimize stress concentration at that point. As the shaft rotates or reciprocates the points of maximum deflection of the sleeve will follow the shaft and compensate for out of roundness or surface roughness. Experience has shown that an unrestrained shaft mounted freely within two such compliant bearing seals will rotate independently because of the continuous compliance of the sleeve to the shaft surface. A requireent of greater bearing strength imposes reduced compliance. Conversely, acceptance of less than maximum deflection to increase allowable bearing loads will be limited by leakage that can be tolerated. Therefore, for maximum bearing capacity a maximum initial clearance will be used whereas for maximum sealing effect a minimum initial clearance is dictated.

A MOVABLE SEAL

Figure 4:
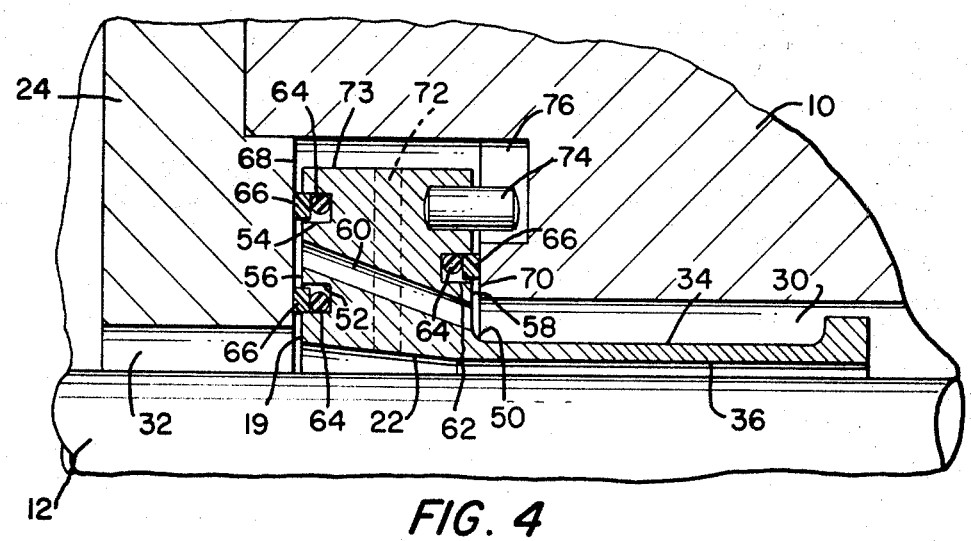
FIG. 4 is a side elevational view partly in section showing an embodiment of my invention in which the flange is movable within the housing.

The bearing effect can be overriden by excessive whipping forces. Where such conditions exist, physical contact between the shaft and the compliant sleeve seal can be avoided by an embodiment with a movable flange as is shown in FIG. 4. The low pressure face 19 has an inner annular groove 52 and an outer annular groove 54 coaxial with the flange which define a pressure relief surface 56 equal in area to the high pressure surface 58. Surfaces 56 and 58 are connected by one or more system pressure communicating passageways 60 which serve to balance the pressure on the two faces.

The high pressure side of the flange is also provided with a coaxial annular groove 62. In each of the grooves described a resilient O-ring 64 resides and pressure dam rings 66 are axially slidably superimposed on the O-rings. The O-ring is generally made of an elastomer, but for high temperature applications metallic O-rings may be used. The pressure dam rings may be made a metal-plastic composite, typically bronze filled teflon, the composition being dictated by the surface conditions. The sliding rings on the low pressure side of the flange are pressed against the gland wall 68 by the system pressure and the O-rings, and on the high pressure side of the flange the sliding ring is pressed against housing face 70 with sufficient force to establish pressure dams against leakage around the flange.

In operation, when a shaft whips with a force that exceeds the bearing capacity of the compliant sleeve seal, a flange of this configuration will move transversely before metal to metal contact between the sleeve and shaft is made. A passageway 72 communicating between the inner flange surface 22 and outer flange surface 73 balances the pressure on those faces and reduces resistance to movement of the flange. One or more passageways may be used to communicate between the surfaces. The pin 74 is provided in the flange to prevent rotation of the compliant sleeve seal by engagement with slot 76 in the housing. This is not essential to the operation of the seal.

The simpler embodiment illustrated in FIG. 8 functions as a floating seal when system pressure is low. The axial force on the flange due to a difference in the areas of faces 16 and 18 prevents leakage past pressure dam 21 but it does not create such static friction force that movement against gland face 20 is inhibited. At high pressures, the absence of pressure balancing faces and passageways does inhibit movement, and converts the seal into a hydrostatic bearing. It has been found that extraordinary shaft loads as may result from cavitation at the impellers will override the frictional force and cause the seal to move radially as a unit.

A CONSTANT FLOW VALVE

Figure 5:
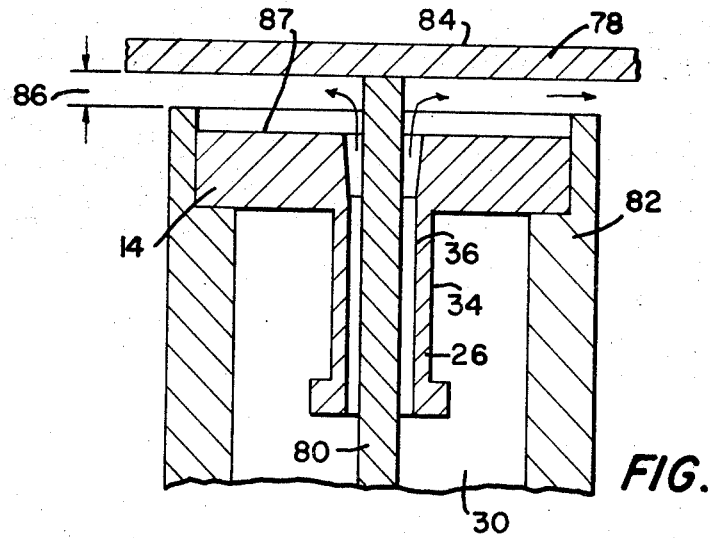
FIG. 5 is a side elevational view of my invention showing the use of my invention as a valve.

FIG. 5 illustrates the application of the compliant sleeve seal as a self-regulating constant flow valve. Table 78 having a shaft 80 is mounted on the seal so as to provide a flow path for fluid under pressure within the housing 82 as indicated by the arrows. As a load is imposed on surface 84 the upper flow path 86 is constricted, increasing the pressure sensed by the inner surface of the sleeve 36 and decreasing the pressure differential between that surface and the outer sleeve surface 34. This results in a relaxation of the compliant sleeve and an increase in pressure at face 87 of the seal flange 14 which results in a constant flow past 86 despite constriction of the path. As the load is removed from surface 84 the opposite obtains. The decresing pressure along the fluid path is sensed at the inner sleeve surface 36, consequently increasing the pressure differential between the inner and outer sleeve surfaces, resulting in a compliance of the sleeve to conform more closely to the shaft. In this way, the constant flow continually adjusts the pressure to provide the support needed by the changing weight on the table.

An eccentric shifting of the load on surface 84 would result in an angular displacement of the shaft immediately sensed by the sealed sleeve as a localized pressure decrease with a reciprocal pressure increase displaced 180° therefrom. At the low pressure side the sleeve would produce a constrictive throat and develop a force equal to the area between curves 40 and 42 in FIG. 3C to bring the shaft back into concentricity with the seal flange. Simultaneously the fluid which has approached system pressure on the opposite side of the shaft exerts a force equal to the area between curves 40 and 44 in FIG. 3C to push the back into concentricity. As a valve, then, the seal imparts a transverse and axial rigidity to the shaft mounted table, but imposes practically no rotational restraint on the movable member.

A greater flow rate can be achieved by increasing the wall thickness of the compliant sleeve or decreasing its length.

A CARTRIDGE SEAL

For systems in which a sleeve may be undesirable an alternative embodiment with a compliant seal in a cartridge may be used.

Figure 6:
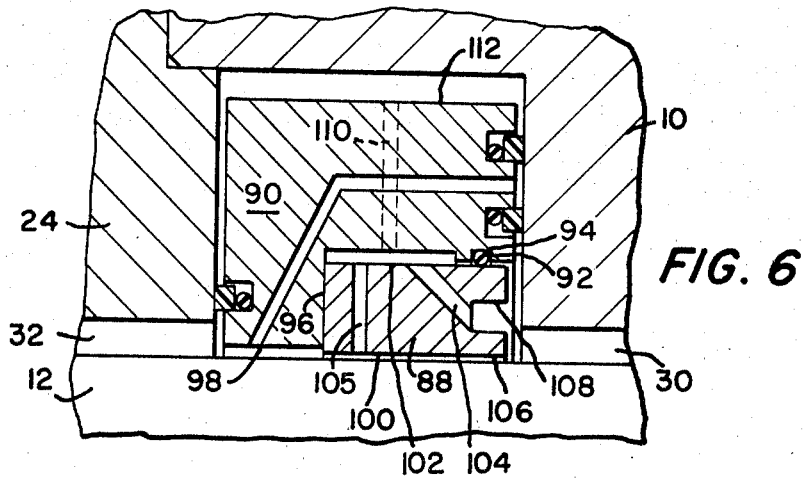
FIG. 6 is an elevational view in section showing a compliant seal contained in a movable cartridge.

Referring more particularly to FIG. 6, it can be seen that the sleeve function is now performed by a compliant seal 88 which is centered in a cartridge 90 by a centering resilient ring 92 which occupies annular groove 94. As in the previous embodiment, pressure dams isolate equal and opposite pressure relief surfaces to permit the cartridge transverse movement between the gland 24 and housing 10 when so required by shaft vibration.

The compliant seal is composed of a metal plastic composite, typically a bronze filled teflon, which requires a metallic back-up ring, the cartridge 90, for strengthening. When subjected to elevated pressure and temperature, this material tends to extrude. Therefore, the cartridge must provide support at interface 96 and maintain a maximum clearance 98. The centering ring 92 is necessary, because the coefficient of expansion of the compliant seal 88 is greater than that of the cartridge 90, and the seal could work loose of the cartridge at lower temperatures.

In operation the clearance between the seal and shaft 100 is always exceeded by the cartridge and shaft clearance 98. Therefore, metal to metal contact between cartridge and shaft is avoided. During start-up or when system pressure is equal to atmospheric pressure, line contact between the compliant seal and the shaft does exist, but the initial operation under normal conditions deposits a thin film of lubricant from the seal on to the shaft surface, thereby minimizing subsequent start-up torque. Contact generates heat, causing the seal to expand away from the shaft. However, the pressure differential makes the seal contract, creating a balance between expanson and contraction forces that provides the required running clearance.

As the system pressure builds up, a pressure gradient develops along the seal clearance 100. The outer annular surface of the seal 102 is exposed to the system pressure by communicating passageway 104. The pressure differential between surface 102 and inner seal surface 106 causes the seal to constrict clearance 100 until the pressure is balanced. The compliant seal continually searches for pressure differentials and thereby conforms to the shaft maintaining a thin film of the fluid under pressure even when the shaft has small eccentricities or transverse vibrations. By providing annular groove 108 the radial pressure of the centering ring upon the compliant seal is relieved and unwanted deformation causing contact with the shaft is avoided. A pressure relief passage 110 communicating from the outer annular surface of the cartridge 112 and outer seal surface 102 balances the pressure on the system side of the seal and reduces resistance to centralizing movement of the cartridge. The other pressue relief passage 105 in the seal communicates from the outer seal surface 102 to the inner seal surface 106 to prevent the compliant seal from contracting.

SECONDARY SEALING ARRANGEMENT FOR INJECTION SYSTEM

Figure 7:
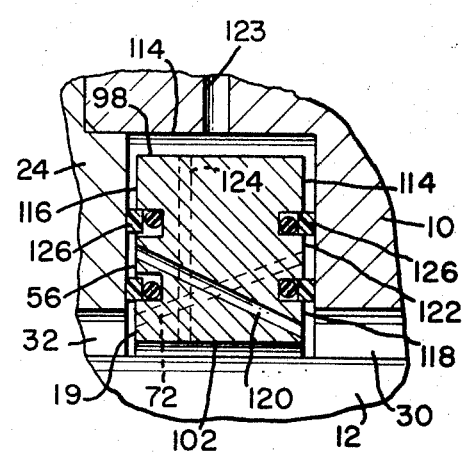
FIG. 7 is a fragmentary elevational view in section showing an embodiment of my invention adapted for use with an injection pressure system.

Pressurized systems with reciprocating shafts that develop 100 psi or more may reduce the internal pressure to atmosphere during the inward stroke of the shaft. In such systems it is customary to introduce an injection pressure to permit transverse movement of the seal within the housing and to supply a positive pressure of the fluid under pressure at the seal shaft interface to prevent contamination by the atmsphere. The pressure dams of my movable seals described above are adaptable to such a situation as can be readily seen by reference to FIG. 7. The in-board 114 and out-board 116 sides of the seal each have two concentric annular grooves which define pressure relief surfaces equal in area to the corresponding high or low pressure surface on the opposite side of the seal, and with which each pressue relief surface is in communication through a passageway.

In operation, as shaft 12 moves outward the system pressure increases, thereby exerting a force on inner high pressure face 118 tending to press the seal against gland 24. To balance this force surface 118 is connected by at least one system pressure passage 120 to pressure relief surface 56 which is of equal area and is defined by the grooves and rings in that face of the seal. Atmospheric pressure on low pressure face 19 is similarly balanced by a communicating passage 72 to the equal and opposite area of low pressure relief face 122. As positive pressure is maintained within the system, a film of the fluid under pressure lubricates the shaft seal interface and prevents contamination from the atmosphere. During the inward stroke of the shaft, system pressure may drop to atmospheric level. Shaft contact and environmental contamination is avoided by the introduction of the system fluid under positive pressure through passageway 123. The cylindrical chamber defined by the outer annular surface of the seal and the inner annular surface of the housing communicates with the inner seal surface 102 through injection passageway 124, thus assuring centering of the seal on the shaft and sealing against the atmosphere. The outer slidable rings 126 dam the injection fluid against escape through either of the pressure relief passageways.

I claim:

1. A seal for rotating equipment and reciprocating equipment comprising an annular flange having a high pressure and a low pressure lateral face and inner and outer annular surfaces, at least one passageway with ports communicating between the lateral faces, and at least one passageway with ports communicating between the inner and outer annular surfaces to equalize the pressure on the connected surfaces, an annular groove in the face on the high pressure side of the seal coaxial with the flange, located radially outward of the passageway port, two concentric annular grooves in the low pressure face coaxial with the flange, one radially outward and one radially inward of the passageway communicating between lateral surfaces, a resilient O-ring in each groove, a rigid ring in each groove laterally movably superimposed on the O-ring, an annular sleeve with inner and outer surfaces coaxially projecting from the high pressure face of the flange located radially inwardly of the lateral communicating passageway, whereby a pressure differential between the inner and outer sleeve surfaces will cause the sleeve to flex radially inward.

2. The seal of claim 1 wherein a recess is provided to receive a pin, a pin is located in the recess to prevent rotary movement of the seal, the O-ring is made from an elastomer, and a stiffening collar is located at the outer end of the sleeve to facilitate the manufacture and confine the area of radial flexing of the sleeve.

3. In combination with a housing having a means for subjecting the inside of the housing to an external fluid pressure, a fluid outlet, a gland, and a movable shaft, a seal comprising an annular flange having a high pressure and a low pressure lateral face and inner and outer annular surfaces, at least one passageway with ports communicating between the lateral faces, and at least one passageway with ports communicating between the inner and outer annular surfaces to equalize the pressure on the connected surfaces, an annular groove in the face on the high pressure side of the seal coaxial with the flange, located radially outward of the passageway port, two concentric grooves in the low pressure face coaxial with the flange, one radially outward and one radially inward of the passageway communicating between lateral surfaces, a resilient O-ring in each groove, a rigid ring in each groove axially movable superimposed on the O-ring, an annular sleeve with inner and outer surfaces coaxially projecting from the high pressure face of the flange located radially inwardly of the laterally communicating passageway, whereby a pressure differential between the inner and outer sleeve surface will cause the flange to flex radially inward to conform to the shaft, and whereby the pressure equalizing passages and axially movable rings permit movement of the flange between housing and gland to accommodate transverse vibrational movement of the shaft.

4. In a system subject to fluid pressure variations including a housing having a bore, a movable shaft mounted within said bore, and a recess around said bore, the improvement comprising: a seal flange mounted within the recess and extending into the housing bore, and having a central bore of greater width than the width of the movable shaft; a flexible sleeve connected to one axial side of the seal flange and projecting axially within the housing bore between the wall of the housing bore and the movable shaft; and pressure sealing means located to direct fluid flow into the space separating the movable shaft and the flexible sleeve, the flexible sleeve being constructed so that a higher pressure applied to the outer sleeve surface than the inner sleeve surface will cause the sleeve to flexibly conform to the surface of the movable shaft while remaining out of contact with the shaft.

5. The improvement of claim 4 wherein the pressure sealing means is a resilient ring mounted in the housing and in sealing engagement with the flange.

6. The improvement of claim 4 wherein the pressure sealing means is a dam provided on the other axial side of the seal flange with said dam being in contact with the recess wall.

7. The improvement of claim 4 wherein:
a pin interconnects the seal flange and a pin recess in the housing, said pin and pin recess being shaped to prevent rotational movement of the seal flange while permitting radial movement of said flange.

8. The improvement of claim 4 wherein:
said flange is firmly fitted in the recess to prevent both rotational and radial movement of the flange.

9. A seal for rotating equipment and reciprocating equipment comprisng an annular flange having a high pressure and a low pressure lateral face and inner and outer annular surfaces, at least one passageway with ports communicating between the lateral faces, and at least one passageway with ports communicating between the inner and outer annular surfaces to equalize the pressure on the connected surfaces, a pressure seal on the high pressure side of the seal coaxial with the flange, located radially outward of the passageway port, two pressure seals on the low pressure face coaxial with the flange, one radially outward and one radially inward of the passageway communicating between lateral surfaces, an annular sleeve with inner and outer surfaces coaxially projecting from the high pressure face of the flange located radially inwardly of the lateral communicating passageway, whereby a pressure differential between the inner and outer sleeve surfaces will cause the sleeve to flex radially inward.

* * * * *